United States Patent Office 3,239,571
Patented Mar. 8, 1966

3,239,571
HYDROFORMYLATION OF OLEFINS
Lynn H. Slaugh, Pleasant Hill, and Richard D. Mullineaux, Oakland, Calif., assignors to Shell Oil Company, New York, N.Y., a corporation of Delaware
No Drawing. Filed July 8, 1963, Ser. No. 293,250
10 Claims. (Cl. 260—632)

This invention relates to the production of aldehydes and/or alcohols from olefinically unsaturated compounds. The invention relates more particularly to the production of aldehydes and/or alcohols by the addition of carbon monoxide and hydrogen to olefinic hydrocarbons in the presence of an improved catalyst.

This application is a continuation-in-part of copending application, Serial No. 46,071, filed July 29, 1960, now abandoned.

Processes directed to the production of reaction mixtures comprising substantial amounts of aldehydes and at times lesser amounts of alcohols by the reaction of olefinic compounds with carbon monoxide and hydrogen at elevated temperatures and pressures in the presence of certain catalysts are well known in the art. The aldehydes and alcohols produced generally correspond to the compounds obtained by the addition of a carbonyl or carbinol group to an olefinically unsaturated carbon atom in the starting material with simultaneous saturation of the olefin bond. Isomerization of the olefin bond may take place to varying degrees under certain conditions with the consequent variation in the products obtained. These processes known in the industry and referred to herein as hydroformylation, involve reactions which may be shown in the general case by the following equation:

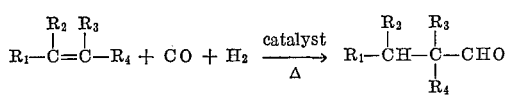

and/or

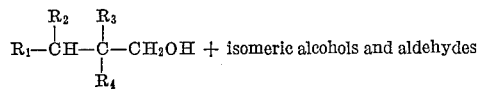

$R_1-CH-C-CH_2OH$ + isomeric alcohols and aldehydes

In the above equation, each R represents an organic radical, for example hydrocarbyl, or a suitable atom such as hydrogen or a halogen. The above reaction is similarly applied to an olefinic linkage in a cycloaliphatic ring.

In the past, dicobalt octacarbonyl as such or in several different forms generally has been used as the catalyst for the hydroformylation of olefins. This catalyst, which can be prepared from many forms of cobalt, usually decomposes rapidly unless high pressures (1000–4500 p.s.i.g.) of carbon monoxide are maintained. Correspondingly high pressures of hydrogen are also necessary. A most serious disadvantage of prior hydroformylation processes, however, has been the necessity of proceeding in two steps when alcohols are the desired product. Thus in processes disclosed heretofore, it is generally necessary first to react the olefin to be hydroformylated with carbon monoxide and hydrogen to form the corresponding aldehyde. It is then necessary to carry out a second reaction with hydrogen to reduce the aldehyde to the alcohol in a separate operation. A different catalyst for the hydrogenation is usually needed for this second step since the hydroformylation catalysts heretofore employed are not sufficiently effective for this purpose. This results in the need for relatively expensive high-pressure equipment and for a large amount of such equipment to handle the two steps.

A further disadvantage inherent in processes directed to hydroformylation disclosed heretofore is a relative inability to direct the reactions involved to the production of predominantly terminal alcohols when the olefin contains more than two carbon atoms, particularly when the charge to the process comprises primarily internal olefins.

It is, therefore, an object of the present invention to provide an improved hydroformylation process enabling the more efficient production of aldehydes and/or alcohols by the catalytic reaction of olefinic compounds with carbon monoxide and hydrogen.

Another object of the present invention is the provision of an improved hydroformylation process enabling the more efficient production of aldehydes and/or alcohols by reaction of olefinic compounds with carbon monoxide and hydrogen in the presence of an improved hydroformylation catalyst.

Still another object of the present invention is the provision of an improved hydroformylation process enabling the more efficient single stage production of alcohols by the reaction of olefinic hydrocarbons with carbon monoxide and hydrogen in the presence of an improved catalyst enabling the use of substantially lower pressures than generally possible heretofore.

Still another object of the present invention is the provision of an improved process enabling the more efficient, direct single stage hydroformylation of internal olefins to reaction products predominating in terminal alcohols. Other objects and advantages of the present invention will become apparent from the following detailed description thereof.

In accordance with the present invention, olefinic compounds are converted to saturated aldehydes and/or alcohols having one more carbon atom than the olefinic compounds by reacting the olefinic compounds in liquid phase, with carbon monoxide and hydrogen, at a temperature of from about 100° to about 300° C. in the presence of a catalyst comprising a metal having an atomic number of from 75 to 78, inclusive, in complex combination with carbon monoxide and a phophorus-containing ligand consisting essentially of a tertiary organo phosphorus compound in which the phophorus is trivalent (referred to herein as phosphines).

The suitable metals having an atomic number of 75 to 78, inclusive, employed as the metal component in the complex catalysts of the present invention consist of rhenium and the platinum group metals, that is, osmium, iridium, and platinum. The complex catalysts containing these metals as essential components are not necessarily equivalent in their effectiveness in catalyzing the hydroformylation reaction under all conditions. The specific complex preferably employed may vary within the scope of the invention in accordance with the specific olefinic compound being hydroformylated and the specific conditions employed. Outstanding in their ability to catalyze the hydroformylation reaction are the catalysts of the present invention comprising platinum in complex combination with carbon monoxide and a tertiary organophosphine.

For the purpose of simplicity, the following detailed description of the invention will stress the use of the preferred platinum-containing complexes. It is to be understood, however, that such illustrative use of the platinum-containing catalysts is not intended to limit the scope of the invention thereto and that any of the suitable complexes, comprising a metal having an atomic number of 75 to 78, defined herein are comprised within the scope of the invention.

In their active form, the suitable complex catalysts will contain the metal having an atomic number of 75 to 78 in a reduced valence state. As used throughout this specification and claims, the term "complex" means a coordination compound formed by the union of one or more electronically rich molecules or atoms capable of independent existence with one or more electronically poor molecules or atoms, each of which is also capable of independent existence.

In the suitable ligands containing trivalent phosphorus comprised in the complex catalyst employed in the process of the invention, the phophorus atom has one available or unshared pair of electrons. Any essentially organic derivative of trivalent phosphorus with the foregoing electronic configuration is a suitable ligand for the complex catalysts of the present invention and will operate as a ligand in forming the desired complexes of rhenium, osmium, iridium and platinum used as catalysts in the present invention.

Organic radicals of any size and composition may be bonded to the phosphorus atom. Contemplated within the scope of this invention, therefore, are trivalent phosphorus compounds having aliphatic, and/or cycloaliphatic, and/or heterocyclic, and/or aromatic radicals satisfying its three valences. These radicals may contain a functional group such as the carbonyl, carboxyl, nitro, amino, hydroxy functional groups, saturated or unsaturated carbon-to-carbon linkages, as well as saturated and unsaturated noncarbon-to-carbon linkages.

It is also suitable for an organic radical to satisfy more than one of the valences of the phosphorus atom, thereby forming a heterocyclic compound with a trivalent phosphorus atom. For example, an alkylene radical may satisfy two phosphorus valences with its two open valences and thereby form a cyclic compound. Another example would be the alkylene dioxy radical to form a cyclic compound where oxygen atoms link an alkylene radical to the phosphorus atom. In these two examples, the third phosphorus valence may be satisfied by any other organic radical.

Another type of structure involving trivalent phosphorus having an available pair of electrons are those containing a plurality of such phosphorus atoms linked by organic radicals. This type of a compound is called a bidentate ligand when two such phosphorus atoms are present, a tridentate ligand when three such phosphorus atoms are present, and so forth. Examples of these polydentate ligands include such structures as:

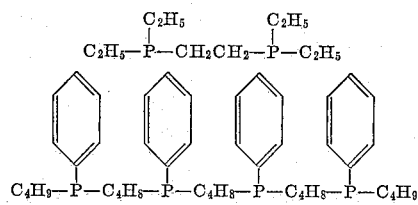

and the like.

Suitable catalysts within the scope of those employed in the process of the invention include the complexes consisting essentially of a metal selected from the group consisting of rhenium, osmium, iridium and platinum, in complex combination with both carbon monoxide and a tertiary organophosphine of the formula $PR_3$ wherein R is an organic radical. Each R in the formula $PR_3$ may represent for example, a hydrocarbyl group, such as alkyl (including cycloalkyl), alkaryl, aralkyl and the like. The phosphorus-containing ligand ($R_3P$) component of the complex catalyst may thus be suitably tertiary phosphine, such as a trialkyl phosphine, a trialkarylphosphine, a triaralkylphosphine, and the like. The hydrocarbyl components, R, need not necessarily be the same and suitable tertiary organophosphine legands comprise the mixed phosphines wherein two or more of the three substituent R's are different members of the groups comprising alkyls, aryls, aralkyls, alkaryls, alkoxy, aralkoxy, and the like. As indicated above, the substituent R's may contain oxygen, halogen (preferably middle halogen) or sulfur atoms. Preferred catalysts of the above-defined class comprise those wherein each R contains from 1 to 20 carbon atoms, and the total number of carbons in the tertiary organophosphine ($R_3P$) group does not exceed about 30. A particularly preferred group of catalysts within the above-defined class are the complexes wherein the phosphorus-containing component of the catalyst is a trialkylphosphine in which each alkyl is a lower alkyl having from 1 to 10 carbons of straight or branched chain structure.

Specific examples of suitable catalysts of the above-defined class comprise complexes of a metal of the group consisting of rhenium, iridium, osmium and platinum with carbon monoxide, and one of the following tertiary organophosphines:

Trimethylphosphine
Triethylphosphine
Tri-n-butylphosphine
Triamylphosphines
Trihexylphosphines
Tripropylphosphine
Trinonylphosphines
Tridecylphosphines
Di-n-butyl octadecylphosphine
Triethylhexylphosphine
Dimethyl-ethylphosphine
Diamylethylphosphine
Triphenylphosphine
Tris(dimethylphenyl)phosphine
Ethyl-bis($\beta$-phenylethyl)phosphine
Tricyclopentylphosphine
Tricyclohexylphosphine
Dimethyl-cyclopentylphosphine
Tri-octylphosphine
Dicyclohexylmethylphosphine
Phenyldiethylphosphine
Dicyclohexylphenylphosphine
Diphenyl-methylphosphine
Diphenyl-butylphosphine
Diphenyl-benzylphosphine
Trilaurylphosphine
Triethoxyphosphine
n-Butyl-diethoxyphosphine Of these catalysts, those containing the metal in complex combination with carbon monoxide and a triacyclic aliphatic phosphine or a trialicyclic aliphatic (cycloalkyl) phosphine are somewhat preferred. A particularly preferred catalyst comprises platinum-carbonyl-tri-n-butyl phosphine.

The above defined complexes, used as catalysts in the process of this invention, may be prepared by a diversity of methods. A convenient method is to combine an organic or inorganic salt of a metal having an atomic number of 75 to 78 with the desired phosphorus-containing ligand, for example, a triorganophosphine such as a trialkylphosphine in liquid phase. Suitable metal salts comprise, for example, the carboxylates such as acetates, octoates, etc., as well as mineral acid salts such as chlorides, sulfates, sulfonates, etc., of platinum, osmium, iridium and rhenium. The valence state of the metal may then be reduced and the metal-containing complex formed by heating the solution in an atmosphere of admixed hydrogen and carbon monoxide. The reduction may be performed prior to the use of the catalysts or it may be accomplished simultaneously with the hydroformylation process of this invention. Complexes of the type defined herein which may comprise a residual portion of starting material or component thereof, for example, chlorine, in additional complex combination therewith, which may at times be formed as a product under the conditions defined herein for the preparation of the suitable complex catalysts, are comprised within the scope of the present invention.

When the catalyst is preformed or prepared in situ, by heating a mineral acid salt of the metal having an atomic number of 75 to 78 in admixture with a tertiary organo phosphine in the presence of both hydrogen and carbon monoxide, the resulting reaction mixture may be treated with a suitable agent capable of accepting or neutralizing acidic reaction byproducts. Thus, an alkaline material or the like may be added either prior to, during the course of, or directly after the preparation of the catalyst complex. A particularly suitable agent for this purpose comprises an alkali metal salt of a lower monocarboxylic acid such as, for example, sodium acetate. Such treatment of the catalyst complex may be employed as an additional means of controlling the character of the hydroformylation products. Thus, under conditions where the use of the untreated catalyst would normally result in the obtaining of hydroformylation products containing substatnial amounts of aldehydes, the treated catalyst complex often facilitates the obtaining of a product predominating in, or even consisting substantially exclusively of, alcohols having one more carbon atom than the olefin charge.

Alternatively, the catalysts may be prepared from a carbon monoxide complex of the metal. For example, it is possible to start with a platinum carbonyl and by heating this substance with a suitable phosphorus-containing ligand of the type previously described, for example, trialkylphosphine, the ligand will replace one or more of the carbon monoxide molecules, producing the desired catalyst.

In accordance with the invention, olefinic compounds are hydroformylated to reaction products predominating in aldehydes and/or alcohols by intimately contacting the olefinic compound in liquid phase with carbon monoxide and hydrogen in the presence of the above-defined catalysts comprising a complex of a metal having an atomic number of 75 to 78 with a phosphorus-containing ligand and carbon monoxide at well-defined conditions of temperature and pressure.

An advantage inherent in the process of the invention resides in the ability of the catalyst to remain stable and exhibit high-activity for relatively long periods of time at very low pressures. Consequently, hydroformylation in accordance with the present invention may be carried out at pressures well below 1000 p.s.i.g. to as low as 1 atmosphere or less. Under comparable conditions, catalysts of the prior art such as dicobalt octacarbonyl, often decompose and become inactive. The invention is, however, not limited in its applicability to the lower pressures and pressures in the broad range from atmospheric up to about 2000 p.s.i.g. and higher may be employed. The specific pressure preferably used will be governed to some extent by the specific charge and catalyst employed. In general, pressures in the range of from about 300 to about 1500 p.s.i.g. and particularly in the range of from about 400 to about 800 p.s.i.g. are preferred. The unique stability of the catalysts of the present invention at the lower pressures makes the use of pressures below about 1500 p.s.i.g. particularly desirable.

Temperatures employed will generally range from about 100° to about 300° C. and preferably from about 150° to about 210° C., a temperature of about 190° C. being generally satisfactory. Somewhat higher or lower temperatures may, however, be used within the scope of the invention.

The ratio of catalyst to the olefin to be hydroformylated is generally not critical and may vary widely within the scope of the invention. It may be controlled to obtain a substantially homogeneous reaction mixture. Solvents are, therefore, not essential. However, the use of solvents which are inert, or which do not interfere to any substantial degree with the desired hydroformylation reaction under the conditions employed, may be used within the scope of the invention. Saturated liquid hydrocarbons, for example, may be used as solvent in the process, as well as ketones, ethers, and the like. Ratios of catalyst to olefin between about 1:1000 and about 10:1 are found to be satisfactory; higher or lower catalyst to olefin ratios may, however, be used within the scope of the invention.

The ratio of hydrogen to carbon monoxide charged may vary widely within the scope of the invention. In general, a mole ratio of hydrogen to carbon monoxide of at least about 1 is employed. Suitable ratios of hydrogen to carbon monoxide comprise those within the range of from about 1 to about 10. Higher or lower ratios may, however, be employed within the scope of the invention. The ratio of hydrogen to carbon monoxide preferably employed will be governed to some extent by the nature of the reaction product desired. If conditions are selected that will result primarily in an aldehyde product, only one mole of hydrogen per mole of carbon monoxide enters into reaction with the olefin. When the alcohol is the desired product, two moles of hydrogen and one mole of carbon monoxide react with each mole of olefin. The minimum ratio of hydrogen to carbon monoxide employed will therefore generally be governed by the product desired. The use of ratios of hydrogen to carbon monoxide which are somewhat higher than those defined by these stoichiometrical values are generally preferred.

A signal advantage of the present invention as indicated above and further evidenced by the following examples is the ability to effect the direct, single stage hydroformylation of the olefins to a reaction mixture wherein the alcohols predominate over the aldehydes. The alcohol product obtained from the starting normal olefins furthermore generally predominates in straight chain or normal isomers. By selection of reaction conditions within the above-defined range, it is now possible to obtain from a normal olefin a product which consists predominantly of a normal or straight chain compound rather than various branched-chain isomers. Generally, the alcohol is the desired end product and the catalysts defined herein will produce this product under a relatively wide range of conditions. However, by varying the operating conditions within the range defined herein, a considerable degree of control over the ratio of aldehyde to alcohol in the product is provided. Adjustment of these variables also enables considerable control over the production of a particular isomer.

A valuable aspect of the invention resides in its ability to effect the direct, single stage hydroformylation of internal normal olefins, having for example, from 4 to 19 carbon atoms to the molecule to normal terminal alcohols having 5 to 20 carbon atoms to the molecule, respectively. Olefinic hydrocarbon fractions, such as, for example, polymeric olefinic fractions, cracked wax fractions, and the like, containing substantial proportions of internal olefins are readily hydroformylated to fractions of hydroformylated products comprising mixtures of terminal aldehydes and alcohols having one more carbon than the olefins in the charge and wherein these alcohols are the predominant reaction product. Such suitable feeds consisting of olefinic hydrocarbon fractions include, for example, $C_7$, $C_8$, $C_9$, $C_{10}$ and higher olefinic fractions as well as olefinic hydrocarbon fractions of wider boiling ranges such as $C_{7-9}$, $C_{10-13}$, $C_{12-16}$, $C_{14-17}$ olefinic hydrocarbon fractions and the like.

Under the above-defined conditions, the olefinic charge will react with carbon monoxide and hydrogen with the formation of reaction products comprising aldehydes and/or alcohols having one more carbon atom per molecule than the olefin charged.

The reaction mixtures obtained may be subjected to suitable catalyst and product separating means comprising one or more such steps, for example, as stratification, solvent extraction, distillation, fractionation, adsorption, etc. Catalyst, or components thereof, as well as unconverted charge, solvent, etc. may be recycled, in part or entirely, to the reaction zone.

The process of this invention is generally applicable to the hydroformylation of any aliphatic or cycloaliphatic compound having at least one ethylenic carbon-to-carbon bond. Thus, it is applied to the hydroformylation of olefins having, for example, from 2 to 19 carbons to reaction mixtures predominating in aliphatic aldehydes and alkanols having one more carbon atom than the starting olefin. The invention is used to advantage in the hydroformylation of carbon-to-carbon ethylenically unsaturated linkages in hydrocarbons. Monoolefins such as ethylene, propylene, butylene, pentenes, hexenes, heptenes, octenes, dodecene, their homologues, etc., are a few examples of suitable hydrocarbons. Suitable hydrocarbons include both branched- and straight-chain compounds having one or more of these ethylenic or olefinic sites. These sites may be conjugated, as in 1,3-butadiene, or non-conjugated, as in 1,5-hexadiene. In the case of polyolefins, it is possible to hydroformylate only one of the olefinic sites or several or all of these sites. The unsaturated carbon-to-carbon olefinic linkages may be between terminal and their adjacent carbon atoms, as in 1-pentene, or between internal chain carbon atoms, as in 4-octene.

Hydroformylation of macromolecular materials involving acyclic units of the above types such as polydiolefins like polybutadiene, as well as copolymers of olefins and diolefins like the styrene-butadiene copolymer, is also comprised within the scope of the invention.

Hydrocarbon cyclic compounds are equally suitable for use in this invention. This group includes the unsaturated alicyclic hydrocarbons such as the cyclic olefins containing carbon-to-carbon unsaturation such as the cycloalkenes like cyclopentene, cyclohexene, cycloheptene, and 1,5-cyclooctadiene. Also included in this category are the terpenes and fused-ring polycyclic olefins, such as 2,5-bicyclo(2,2,1)-heptadiene, 1,4,4a,5,8,8a - hexahydro-1,4,5,8-dimethanonaphthalene and the like.

The process of this invention may also be used to hydroformylate ethylenic carbon-to-carbon linkages of non-hydrocarbons. Thus it is possible to hydroformylate olefinically unsaturated alcohols, aldehydes, and acids to corresponding alcohols, aldehydes, and acids containing an aldehyde or hydroxy group on one of the carbon atoms previously involved in the olefinic bond of the starging material. The following are a few specific examples of different types of olefinic compounds that may be hydroformylated in accordance with the invention and the products obtained thereby:

$$CH_3(CH_2)_3CH=CH_2 + CO + H_2 \xrightarrow[\Delta]{catalyst}$$
1-hexene $CH_3(CH_2)_5CHO$ and/or $CH_3(CH_2)_5CH_2OH$ + isomeric products
1-heptanal       1-heptanol $$CH_2=CHCl + CO + H_2 \xrightarrow[\Delta]{catalyst} ClCH_2CH_2CH_2OH$$
3-chloropropanol and/or $ClCH_2CH_2CHO$ + isomeric products
3-chloropropanal $$CH_3COOCH_2CH=CH_2 + CO + H_2 \xrightarrow[\Delta]{catalyst}$$
allyl acetate $CH_3COOCH_2CH_2CH_2CHO$
γ-acetoxybutyraldehyde and/or $CH_3COOCH_2CH_2CH_2CH_2OH$ + isomeric products
Δ-acetoxybutanol

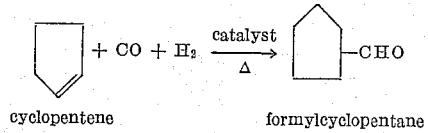

cyclopentene      formylcyclopentane and/or

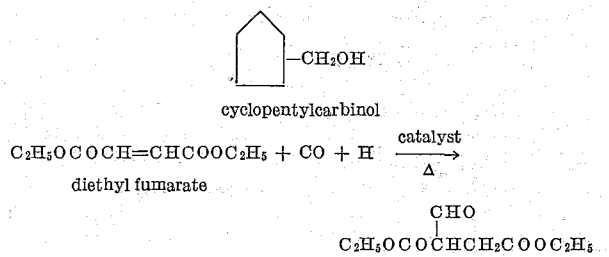

cyclopentylcarbinol $$C_2H_5OCOCH=CHCOOC_2H_5 + CO + H \xrightarrow[\Delta]{catalyst}$$
diethyl fumarate $$\underset{\text{diethyl α-formylsuccinate}}{C_2H_5OCOCHCH_2COOC_2H_5}$$
             | 
            CHO and/or $$\underset{\text{diethyl α-methylolsuccinate}}{C_2H_5OCOCHCH_2COOC_2H_5}$$
            |
         CH_2OH

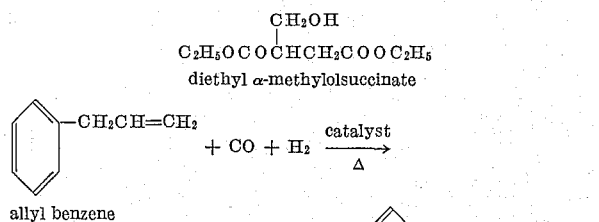

allyl benzene

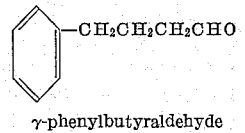

γ-phenylbutyraldehyde and/or

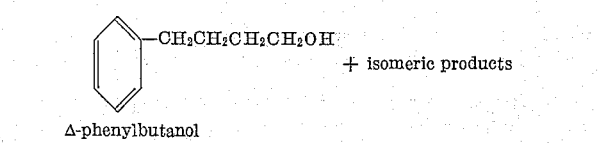

+ isomeric products

Δ-phenylbutanol

The olefinic charge to the process of the invention may comprise two or more of the above-defined suitable olefins. Olefinic hydrocarbon fractions are hydroformylated under the conditions above-defined to mixtures of aldehydes and alcohols in which the alcohols predominate.

The following examples are illustrative of the process of this invention.

Example I

Pentene, taken as a typical olefin, was hydroformylated by reaction with carbon monoxide and hydrogen in the presence of a catalyst consisting of platinum in complex combination with carbon monoxide and tributylphosphine in a reactor comprising a 100-ml. stainless-steel autoclave, provided with magnetic stirrer, connected to a 0–1000 p.s.i.a. transducer and to a source of a premixed hydrogen-carbon monoxide gas. The volume of the external fittings was kept to a minimum to provide a miximum sensitivity of pressure to the change in number of millimoles of hydrogen and carbon monoxide present. The catalyst complex was prepared in situ by bringing together platinum chloride, tri-n-butylphosphine and a suittable solvent and heating in an atmosphere comprising both carbon monoxide and hydrogen to about 195° C., thereby forming the platinum-carbonyl-tri-(n-butyl) phosphine complex.

In a Run A, 64 mmoles of pentene, 20 ml. of octane (solvent), 4 mmoles of tri-n-butylphosphine and 2 mmole $PtCl_2$ were charged to the reactor. A taflon magnetic stirring bar was added. The reactor was closed, cooled, evacuated, flushed with $H_2$–CO gas and then pressured with admixed hydrogen-carbon monoxide gas containing a mole ratio of hydrogen to carbon monoxide of 1. The autoclave was then heated to 195° C. by an external heater. (The resulting reaction mixture contained platinum-tri-n-butylphosphine complex, having a mole ratio of tri-n-butylphosphine to platinum of 2, in a concentration of 0.07 moles per liter.) Heating at the temperature of 195° C. under CO=$H_2$ pressure was continued for 12 hours. The maximum pressure attained in the reactor was 500 p.s.i.g. Stirring of the autoclave contents was effected by the teflon-covered stirring bar inside the autoclave which was set in motion by an external magnetic stirring motor. The pressure decrease resulting from consumption of hydrogen and carbon monoxide was recorded on a Daystrom Weston recorder. At the end of the 12-hour period, the reactor was cooled and the contents analyzed. The results obtained are given in the following Table A.

In a Run B, the foregoing Run A was repeated under substantially identical conditions but with the exception that 10 mmoles of sodium acetate were added to the charge. The results obtained are given in the following Table A.

In a Run C, the foregoing Run B was repeated under substantially identical conditions but with the exception that the tri-n-butylphosphine was omitted from the charge. The results obtained are given in the following Table A.

TABLE A

| Run | A | B | C |
|---|---|---|---|
| Catalyst | Platinum-carbonyl-tri-n-butyl-phosphine complex | Platinum-carbonyl-tri-n-butyl-phosphine complex—sodium acetate added | $PtCl_2$ |
| Conversion, percent | 40.9 | 45.6 | 12.4 |
| Selectivity, percent to: | | | |
| $C_6$ aldehydes | 48.6 | 0 | 24.1 |
| $C_6$ alcohols | 5.3 | 66.2 | 0 |
| Product Isomer Distribution: | | | |
| n-Hexyl | 16.7 | 87.9 | |
| Branched-hexyl | 28.3 | 12.1 | (a) | a Insufficient product to enable accurate determination.

Example II

A platinum-carbonyl-tri-(n-butylphosphine) complex is prepared by heating at a temperature of 195° C. in an atmosphere of admixed hydrogen-carbon monoxide gas ($CO:H_2=1$ mole ratio): platinum chloride ($PtCl_2$), tri-n-butylphosphine, sodium acetate and n-hexane as solvent, in a mole ratio of $PtCl_2:n-Bu_3P:CH_3COONa$ of 1:8:8, respectively. The resulting reaction mixture containing platinum-carbonyl-tri-n-butylphosphine having a $nBu_3P/Pt$ ratio of 8 is charged to a reactor. There is added 1-butylene and additional hexane as solvent to result in a reaction mixture containing 2.3 moles of 1-butylene and 0.071 moles of the catalyst complex per liter of total reaction mixture. The reaction mixture is heated at 195° C., with stirring, under a pressure of admixed carbon monoxide and hydrogen ($H_2/CO$ molar ratio=2) for a period of 6 hours. The maximum pressure attained is 450 p.s.i.g. Thereafter the reactor is cooled and the contents analyzed. There is obtained a conversion of 1-butene of 30% with a selectively to total formylation products of 65% consisting predominantly of n-pentanol.

Example III

The following experiments illustrate the activity of the complex catalysts of the invention, as opposed to the relative inactivity of the source compound of the metal component thereof in the absence of the phosphine ligand under otherwise similar conditions.

In the reactor described in foregoing Example I, a reaction mixture consisting of 1-pentene, octane solvent, and iridium chloride ($IrCl_4$), containing 2.3 moles of 1-pentene per liter and 0.07 moles of $IrCl_4$ per liter, was heated at 195° C. under a maximum pressure of admixed hydrogen-carbon monoxide ($H_2:CO$ mole ratio=2.1) of 450 p.s.i.g. There then resulted a complete decomposition of the $IrCl_4$ without any substantial 1-pentene conversion. The experiment was repeated under substantially identical conditions but with the exception that 2 moles of tri-n-butyl-phosphine per liter of solution were added to the charge. Iridium-carbonyl-tri(n-butylphosphine) complex formed and remained stable; and the 1-pentene conversion was now 82.3. The hydroformylation products consisted essentially of $C_6$ alcohol.

Repetition of the foregoing comparative runs under substantially identical conditions but with the exception that osmium chloride ($OsCl_4$) was substituted for $IrCl_4$ and that the pressure and temperature were raised to 550 p.s.i.g. and 250° C. respectively resulted in only negligible conversion of 1-pentene in the absence of the tri-n-butylphosphine and a conversion of 28.7% in the presence of the complex forming tri-n-butylphosphine.

Example IV 1-pentene was hydroformylated in the presence of rhenium-carbonyl-tri-n-butylphosphine complex and diphenyl ether as solvent, under a maximum carbon monoxide-hydrogen pressure of 1390 p.s.i.g., at 250° C. The reaction mixture contained 0.07 mole per liter of the rhenium-carbonyl-tri-n-butylphosphine complex and 2.3 moles of 1-pentene per liter. (The catalyst complex was obtained by heating $NH_4ReO_4$ and tri-n-butylphosphine in a mole ratio of $n-Bu_3P$ to $NH_4ReO_4$ of 2 in an atmosphere of admixed carbon monoxide and hydrogen.) There was obtained a 1-pentene conversion of 62.4, the hydroformylation products consisting essentially of $C_6$ alcohols, 92.5% of which was n-hexanol.

Example V

Similarly, the following olefinic compounds are hydroformylated to hydroformylation products consisting of aldehydes and alcohols having one more carbon atom to the molecule than the olefinic charge, in the presence of the complex catalysts and under the reaction conditions set forth in the foregoing Examples I through IV:

Propylene
1-butene
2-pentene
Isobutylene
2-me-1-pentene
Dodecene
Cyclohexene
$C_{12-14}$ olefinic hydrocarbon fraction

We claim as our invention:

1. The process for the production of aldehydes and alcohols which comprises contacting a mono-olefinic hydrocarbon with carbon monoxide and hydrogen at a temperature of from about 100° to about 300° in the presence of a complex catalyst consisting essentially of a metal having an atomic number of 75 to 78 inclusive in complex combination with carbon monoxide and a trialkylphosphine, thereby reacting said mono-olefinic hydrocarbon with said carbon monoxide and hydrogen with the formation of aldehydes and alcohols having one more carbon atom than the olefinic compound.

2. The process for the production of aldehydes and alcohols which comprises contacting a mono-olefinic hydrocarbon with carbon monoxide and hydrogen at a temperature of from about 100° to 300° and a pressure of from about 1 atmosphere to about 2000 p.s.i.g., in the presence of a complex catalyst consisting essentially of a metal having an atomic number of 75 to 78 inclusive in complex combination with carbon monoxide and a trialkylphosphine, thereby reacting said mono-olefinic hydrocarbon with the formation of aldehydes and alcohols having one more carbon atom than said olefinic hydrocarbon.

3. The process for the production of aldehydes and alcohols which comprises contacting a mono-olefinic hydrocarbon with carbon monoxide and hydrogen at a temperature of from about 100° to about 300° C. and a pressure of from about 1 atmosphere to about 2000 p.s.i.g., in the presence of a complex catalyst consisting essentially of platinum in complex combination with carbon monoxide and a trialkylphosphine hydrocarbylphosphine, thereby reacting said mono-olefinic hydrocarbon with carbon monoxide and hydrogen with the formation of aldehydes and alcohols having one more carbon atom than said mono-olefinic hydrocarbon.

4. The process for the production of oxygenated hydrocarbons consisting essentially of aliphatic aldehydes and alcohols having from 3 to 20 carbon atoms to the molecule which comprises contacting a mono-olefinic hydrocarbon having from 2 to 19 carbon atoms to the molecule at a temperature of from about 100° to about 300° C. and a pressure of from about 1 atmosphere to about 1500 pounds with carbon monoxide and hydrogen in the presence of a catalyst consisting essentially of a metal having an atomic number of 75 to 78 inclusive in complex combination with both carbon monoxide and a trialkylphosphine thereby reacting said olefinic hydrocarbon with carbon monoxide and hydrogen with formation of aliphatic aldehydes and alcohols having one more carbon atom to the molecule than said mono-olefinic hydrocarbon.

5. The process for the production of aliphatic aldehydes and alcohols having from 3 to 20 carbon atoms to the molecule which comprises reacting a mono-olefinic hydrocarbon having from 2 to 19 carbon atoms to the molecule at a temperature of from about 100° to about 300° C., and a pressure of from about 1 atmosphere to about 1500 p.s.i.g., with carbon monoxide and hydrogen, in the presence of a complex catalyst consisting essentially of platinum in complex combination with carbon monoxide and a trialkylphosphine, wherein each alkyl group contains from 1 to 20 carbons.

6. The process in accordance with claim 5 wherein said trialkylphosphine is tri-n-butylphosphine.

7. The process for the production of reaction products consisting essentially of aldehydes and alcohols having six carbons to the molecule, which comprises reacting a pentene with carbon monoxide and hydrogen, at a temperature of from about 100 to about 300° C., and a pressure of from about 1 atmosphere to about 1500 pounds in the presence of a complex catalyst consisting essentially of platinum in complex combination with carbon monoxide and a trialkylphosphine wherein each alkyl group contains 1 to 20 carbon atoms.

8. The process for the direct single-stage conversion of a mono-olefinic hydrocarbon having from 2 to 19 carbon atoms to a corresponding aliphatic alcohol having one more carbon atom to the molecule than said mono-olefinic hydrocarbon, which comprises reacting said mono-olefinic hydrocarbon with carbon monoxide and hydrogen at a temperature of from about 150 to about 210° C., and a pressure of from about 50 to about 500 pounds in the presence of a complex catalyst consisting essentially of platinum in complex combination with carbon monoxide and a trialkylphosphine wherein each alkyl group contains from 1 to 20 carbon atoms.

9. The process in accordance with claim 9 wherein said trialkylphosphine is tri-n-butylphosine.

10. The process for the production of n-hexanol which comprises reacting a normal pentene with carbon monoxide and hydrogen at a temperature of from about 150° to about 210° C. and a pressure of from about 50 to about 500 pounds in the presence of a complex catalyst consisting essentially of a tri-n-butylphosphine-platinum-carbonyl complex.

References Cited by the Examiner
UNITED STATES PATENTS

| | | | |
|---|---|---|---|
| 2,327,066 | 8/1943 | Roelen | 260—604 |
| 2,548,159 | 4/1951 | Houtman et al. | 260—604 X |
| 3,081,357 | 3/1963 | Alderson | 260—604 X |
| 3,102,899 | 9/1963 | Cannell | 260—604 X |
| 3,150,188 | 9/1964 | Eisenmann et al. | 260—604 X |

LEON ZITVER, *Primary Examiner.*

B. HELFIN, R. H. LILES, *Assistant Examiners.*